United States Patent
Sublemontier et al.

(10) Patent No.: US 12,442,752 B2
(45) Date of Patent: Oct. 14, 2025

(54) SYSTEM FOR CHARACTERISING PARTICLES IN THE FORM OF AN AEROSOL IN AN AMBIENT GAS AND ASSOCIATED METHOD

(71) Applicants: Commissariat a l'Energie Atomique et aux Energies Alternatives, Paris (FR); Centre National de la Recherche Scientifique, Paris (FR)

(72) Inventors: Olivier Sublemontier, Gif-sur Yvette (FR); Cesar Alvarez-Llamas, Gif-sur Yvette (FR)

(73) Assignees: Commissariat a l'Energie Atomique et aux Energies Alternatives, Paris (FR); Centre National de la Recherche Scientifique, Paris (FR)

( * ) Notice: Subject to any disclaimer, the term of this patent is extended or adjusted under 35 U.S.C. 154(b) by 196 days.

(21) Appl. No.: 18/014,411

(22) PCT Filed: Jul. 9, 2021

(86) PCT No.: PCT/EP2021/069229
§ 371 (c)(1),
(2) Date: Jan. 4, 2023

(87) PCT Pub. No.: WO2022/008746
PCT Pub. Date: Jan. 13, 2022

(65) Prior Publication Data
US 2023/0258553 A1 Aug. 17, 2023

(30) Foreign Application Priority Data
Jul. 10, 2020 (FR) ........................... 2007326

(51) Int. Cl.
*G01N 15/14* (2024.01)
*G01N 15/1434* (2024.01)
*G01N 15/00* (2006.01)

(52) U.S. Cl.
CPC ..... *G01N 15/1459* (2013.01); *G01N 15/1434* (2013.01); *G01N 2015/0046* (2013.01)

(58) Field of Classification Search
CPC .......... G01N 15/1459; G01N 15/1434; G01N 2015/0046; G01N 21/718
See application file for complete search history.

(56) References Cited

U.S. PATENT DOCUMENTS 7,260,483 B2 * 8/2007 Gard ................... H01J 49/0445
702/30
10,393,587 B1 8/2019 Yoo et al.
(Continued)

FOREIGN PATENT DOCUMENTS

| CN | 111044420 A | 4/2020 |
| WO | 2021/061247 A2 | 4/2021 |

OTHER PUBLICATIONS

International Search Report issued in corresponding International Patent Application No. PCT/EP2021/069229 dated Sep. 23, 2021.
(Continued)

*Primary Examiner* — Michelle M Iacoletti
*Assistant Examiner* — Maher Yazback
(74) *Attorney, Agent, or Firm* — Morgan, Lewis & Bockius LLP

(57) ABSTRACT

The invention concerns a system (S) for characterising the particles of an aerosol, characterised in that it comprises:
 a sampler (E) capable of sampling an ambient gas likely to comprise particles in aerosol form;
 a device (D) for characterising said particles by laser-induced breakdown spectrometry, capable of generat-
(Continued)

ing a jet of particles with the sampled particles and of analysing them by interaction with a laser beam;

at least one means (M) for diluting the concentration of the aerosol particles of the ambient gas sampled by the sampler, to ensure that the focal volume (VF) of the laser beam comprises only one individual particle of the jet.

The invention also relates to a method for implementing the system.

13 Claims, 8 Drawing Sheets

(56) References Cited

U.S. PATENT DOCUMENTS

| | | | | |
|---|---|---|---|---|
| 2011/0036995 | A1* | 2/2011 | Binnie | G01N 15/1404 250/461.1 |
| 2011/0058168 | A1* | 3/2011 | Rich | G01N 15/1434 356/343 |
| 2012/0019825 | A1* | 1/2012 | Thomas | G01N 15/1429 356/338 |
| 2014/0217308 | A1* | 8/2014 | Stucker | G01N 21/6428 250/458.1 |
| 2014/0350394 | A1* | 11/2014 | Niedre | G01N 15/1404 600/426 |
| 2016/0109349 | A1* | 4/2016 | Volckens | G01N 1/2202 356/338 |
| 2016/0260513 | A1* | 9/2016 | Pan | G01N 15/1434 |
| 2016/0334336 | A1* | 11/2016 | Aguilera Andoaga | G01J 3/443 |
| 2022/0044921 | A1* | 2/2022 | McLoughlin | H01J 49/0422 |
| 2023/0039261 | A1* | 2/2023 | Bryden | H01J 49/04 |
| 2024/0027270 | A1* | 1/2024 | Yamamoto | G01J 3/44 |

OTHER PUBLICATIONS

Tjarnhage et al., "Development of a laser-induced breakdown spectroscopy instrument for detection and classification of single-particle aerosols in real-time," Optics Communications, 296: 106-108 (2013).

Carranza et al., "On-line analysis of ambient air aerosols using laser-induced breakdown spectroscopy," Spectrochimica Acta Part B, 56: 851-864 (2001).

Singh et al., "Prospects for laser-induced breakdown spectroscopy for biomedical applications: a review," Lasers in Medical Science, 26: 673-687 (2011).

\* cited by examiner

SYSTEM FOR CHARACTERISING PARTICLES IN THE FORM OF AN AEROSOL IN AN AMBIENT GAS AND ASSOCIATED METHOD

TECHNICAL FIELD OF THE INVENTION

The present invention relates to the field of aerosol characterisation.

The aerosols are composed of particles of varying sizes suspended in an ambient gas, for example the surrounding air.

The aerosols in question may, by way of non-limiting examples, come from an industrial device (e.g. fumes), from an accidental source (e.g. fire) or from the ambient air for which the source of aerosols is not necessarily identified.

Currently, impaction methods are generally used. The impaction is a widely used principle of collecting particles from an aerosol. It consists of sucking into a housing the surrounding air likely to contain an aerosol at a controlled and fixed flow rate to collect particles on a support. After a collection campaign, the support can be recovered and analysed afterwards.

Thus, in the literature, we find impaction devices operating in "cascade". A detailed example of the design of such a device is presented in the article of Misra & al, "*Development and evaluation of a personal cascade impactor sampler (PCIS)*", Aerosol 33 (2002), 1027-1047. The device consists of several impaction stages arranged in series along the flowing of the airflow. The largest, most massive particles comprised in the ambient air impact the first stage. The remaining particles pass through this first stage and the larger particles then impact on the second stage and so on. The different stages, which define the "cascade" principle, allow the collection of particles of various sizes. Such a device therefore allows to know the size of the particles impacted at each stage after the collection campaign.

With this type of device, it is therefore not possible to perform a real-time analysis, as it is necessary to wait until the end of the collection campaign. Moreover, the device used only allows the particles to be classified by their size, typically comprised between a few tens of nm and a few microns. Samples must therefore be performed to characterise the particles using other measurement techniques, in particular to obtain, a posteriori and in the laboratory, the shape, the chemical nature or the concentration of the particles.

However, there are devices for real-time characterisation of particles contained in the surrounding air. For example, the PLAIR company proposes the RAPID-E device allowing for real-time analysis. For more information, please refer to the document US 2019/033191 A1. The measurement principle is based on the fluorescence induced by a particle subjected to a laser beam (sometimes referred to as SLS for "Static Light Scattering"). The angular distribution of the signal scattered by the particle is then analysed by measuring the distribution of the intensity at the level of a photodetector. This type of device allows access to the size and the morphology of the particles. However, to obtain this information, it is necessary to know the optical properties of the material forming the particles under consideration, i.e. their chemical nature. In practice, therefore, it is important to know what is being sampled.

SUMMARY OF THE INVENTION

One objective of the invention is to propose a solution for characterising an aerosol in real time and in situ that is more efficient than existing solutions.

To this end, the invention proposes a system for characterising particles in the form of an aerosol in an ambient gas, characterised in that it comprises:
- a sampler capable of sampling the ambient gas likely to comprise particles in the form of aerosols;
- a device for characterising said particles by laser-induced breakdown spectrometry, the device comprising:
  - a system for generating, from the gas coming from the sampler, a jet of said particles in a chamber with which is associated a means for pumping the gas present in the chamber in order to create a vacuum in the chamber,
  - a laser capable of emitting a laser beam in the form of pulses, with which is associated an optical device arranged to focus said laser beam in the chamber, perpendicularly to a direction of propagation of the particle jet, to create, in a focal volume, a plasma by the interaction between the laser beam and the particles of the jet, said plasma emitting other particles, characteristics of the interaction between the laser beam and said particles of the jet,
  - at least one detection device comprising a means for collecting the particles emitted by the plasma and a means for performing a spectrometric analysis of these particles;
- at least one means referred to as of dilution for decreasing the concentration of the aerosol particles in the ambient gas sampled by the sampler, so that the focal volume comprises at most one individual particle.

The system according to the invention may comprise at least one of the following characteristics, taken alone or in combination:
- said dilution means is located between a sampling area of the ambient gas likely to contain particles in the form of aerosol from the sampler and the device for characterising said particles by laser-induced breakdown spectrometry;
- said dilution means belongs to the sampler;
- an additional dilution means arranged between the sampler and the device for characterising said particles by laser-induced breakdown spectrometry;
- the system comprises a processor configured to control the dilution means, and optionally the additional dilution means, in accordance with the data provided by the detection device of the device for characterising the particles by laser-induced breakdown spectrometry;
- the detection device comprises a plurality of N optical fibres, with N a natural number strictly greater than the unity, one end of each optical fibre being arranged around the focal volume and pointing towards this focal volume to ensure the collection of the particles emitted by the plasma; said optical fibres are mounted on an external wall, of spherical shape, of the chamber;
- the means for performing a spectrometric analysis of the particles emitted by the plasma comprises:
  - at least one filter of the notch type, capable of ensuring a filtering in a given wavelength band, and
  - at least one photodetector, for example of the electron photomultiplier type;
- the means for performing a spectrometric analysis of the particles emitted by the plasma comprises:
  - a plurality of notch type filters, capable of ensuring a filtering in a band of wavelengths distinct from each other, and
  - a photodetector, for example of the electron photomultiplier type, associated with each notch filter;

the means for performing a spectrometric analysis of the particles emitted by the plasma comprises:
an optical spectrograph, equipped with:
a camera of intensified charge coupled device type.
the system comprises a further detection device comprising:
a plurality of optical assemblies, mounted on the chamber and angularly distributed around this chamber, for collecting the particles emitted by the plasma, and
at least one photodetector connected to said plurality of optical assemblies to analyse the angular distribution of said particles;
the system comprises an infrared camera arranged to measure a temperature evolution of the particles in the particle jet.

The invention also relates to a method for implementing a system according to the invention, said method comprising the following steps:
a) sampling an ambient gas, which is likely to comprise particles in aerosol form in a number concentration to be characterised;
b) detecting said particles by laser-induced breakdown spectrometry, each detection consisting of a detection of at most one individual particle in said focal volume;
c) counting, per unit of time, the number of particles detected in the step (b); and
d) determining the number concentration of said particles in the sampled ambient gas from a comparison between the data resulting from the step c) and a database relating said number concentration to said count per unit time.

In addition, between the step a) and the step b), a step may be provided whereby the concentration of the particles present as an aerosol in the sampled ambient gas is reduced in a controlled manner to ensure that the focal volume comprises at most one individual particle.

BRIEF DESCRIPTION OF THE FIGURES

Further characteristics and advantages of the invention will become apparent from the following detailed description, for the understanding of which reference is made to the attached drawings, for which:

FIG. 5b is a view in a first cross-sectional plane of FIG. 5a;

FIG. 5c is a view in a second cross-sectional plane of FIG. 5a;

FIG. 5d is a view in a third sectional plane of FIG. 5a;

DETAILED DESCRIPTION OF THE INVENTION

In the following description, (O, X, Y, Z) defines a direct orthogonal reference frame.

The invention relates to a system S for characterising the particles of an aerosol.

Figure 1:
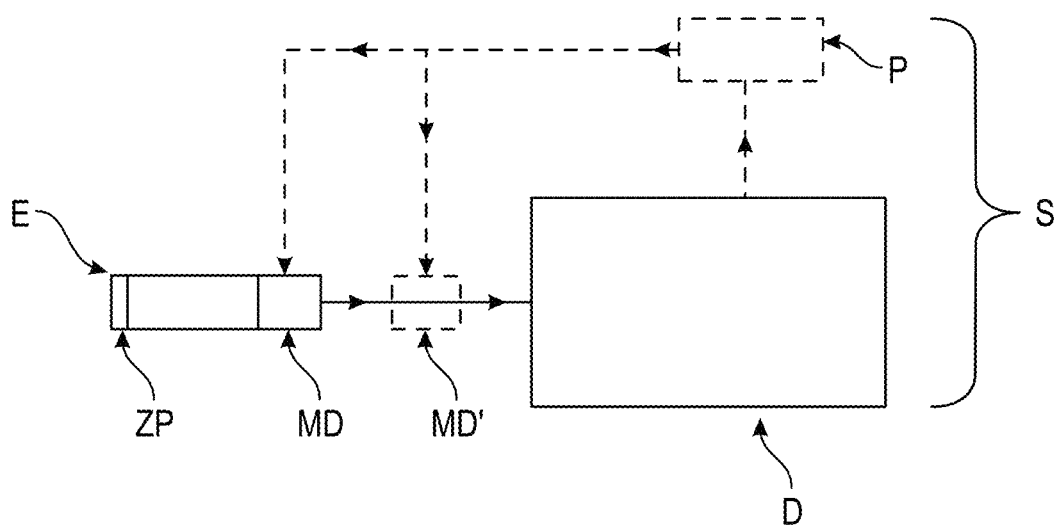
FIG. 1 is a schematic overview of a system for characterising the particles of an aerosol according to the invention.

As schematically represented in FIG. 1, this system S comprises a sampler E capable of sampling an ambient gas likely to comprise particles in the form of aerosol, a device D for characterising said particles by laser-induced breakdown spectrometry (LIBS), and at least one means MD, MD', referred to as dilution, for reducing the concentration of the particles in aerosol form in the ambient gas sampled by the sampler E.

Figure 2:
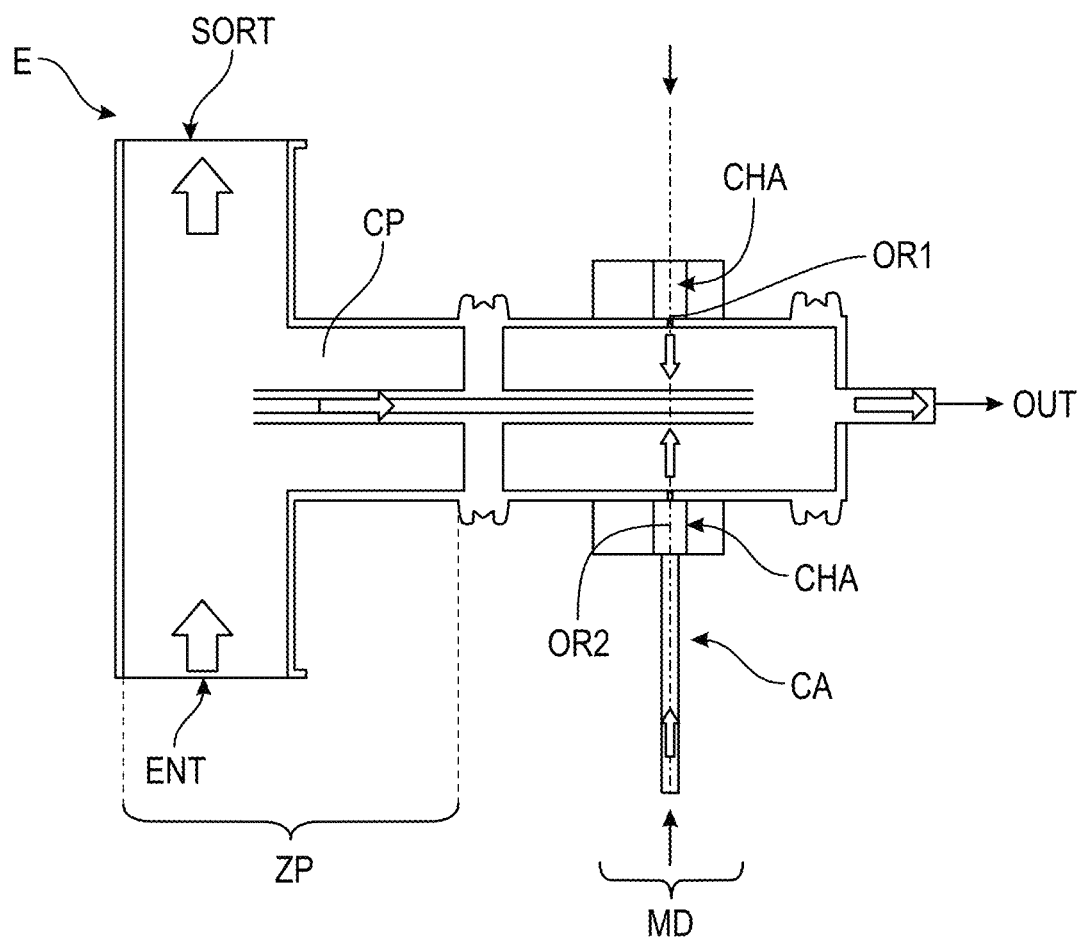
FIG. 2 shows a sampler, belonging to the system shown in FIG. 1, for sampling the aerosol from a surrounding gas.

FIG. 2 shows a cross-sectional view of an example of a sampler E likely to be used in the scope of the invention.

The sampler E comprises a sampling area ZP for the surrounding gas. This sampling area ZP is, for example, in the form of a hollow cylinder CC with an inlet ENT, an outlet SORT and a sampling conduit CP leading into the hollow cylinder CC. The diameter of the sampling conduit CP is significantly smaller than the diameter of the hollow cylinder CC.

In this case, the sampler E is special in that it also integrates the dilution means MD. This dilution means MD is for example in the form of one or more additional conduits CA advantageously opening into an annular chamber CHA connected to the sampling conduit CP by means of a plurality of orifices OR1, OR2 distributed over the internal outline of the annular chamber CHA. The dilution allows to provide an additional gas flow rate in the sampling conduit CP to the gas sampled at the level of the sampling area ZP. The gas does not comprise particles in the form of aerosols. This gas can be air, argon or nitrogen. Moreover, this supply is performed in a relatively homogeneous manner thanks to the annular chamber CHA (which, for example, could, by an asymmetrical dilution gas flow rate supply, be diverted towards the walls of the conduit in question and remain stuck there, ultimately obstructing the conduit) and its orifices OR1, OR2, limiting the losses of particles.

For example, a sampling conduit CP with a diameter of 4 millimetres can be provided. The flow rate sampled through this conduit CP is low, for example between 0.1 l/min and 0.2 l/min (NCTP conditions: Normal Conditions of Temperature and Pressure) depending on the nature of the aerodynamic lens LA chosen for the device D. An annular chamber CHA of length 120 mm, internal diameter 40 mm with 12 orifices evenly distributed around the inner circumference of the annular chamber CHA, each orifice having a diameter of 1 mm, can be provided. Thus, with this design, theoretical losses of about 0.5% of particles were determined for a dilution ratio of 90% (flow rate supply via the orifices of the annular chamber) and theoretical losses of about 1% for a dilution ratio of 50%.

At the outlet OUT of the sampler E, the gas carrying the aerosol particles, possibly diluted, is then directed towards an inlet area ZE of the device D for characterising said particles by laser-induced breakdown spectrometry. The conduit connecting the outlet of the annular chamber CHA, and therefore that of the sampler E, is, using the example mentioned above, 10 mm.

Optionally, an additional means of dilution MD' can be considered. In this case, this additional dilution means MD' is arranged between the sampler E and the device D for characterising said particles by laser-induced breakdown spectrometry. For example, a commercially available dilution device such as the VKL10 E proposed by the PALAS company can be provided.

In the scope of the invention, the dilution means MD, MD' plays a role in determining the particle number concentration (number of particles per unit volume) in the aerosol present in the gas sampled by the sampler (a concentration which is not known in the sampled gas and which it is precisely sought to determine). This is because it must be ensured that the characterisation device D for the particles by laser-induced breakdown spectrometry analyses at most one individual particle at a time (i.e. at most only one particle).

Figure 3:
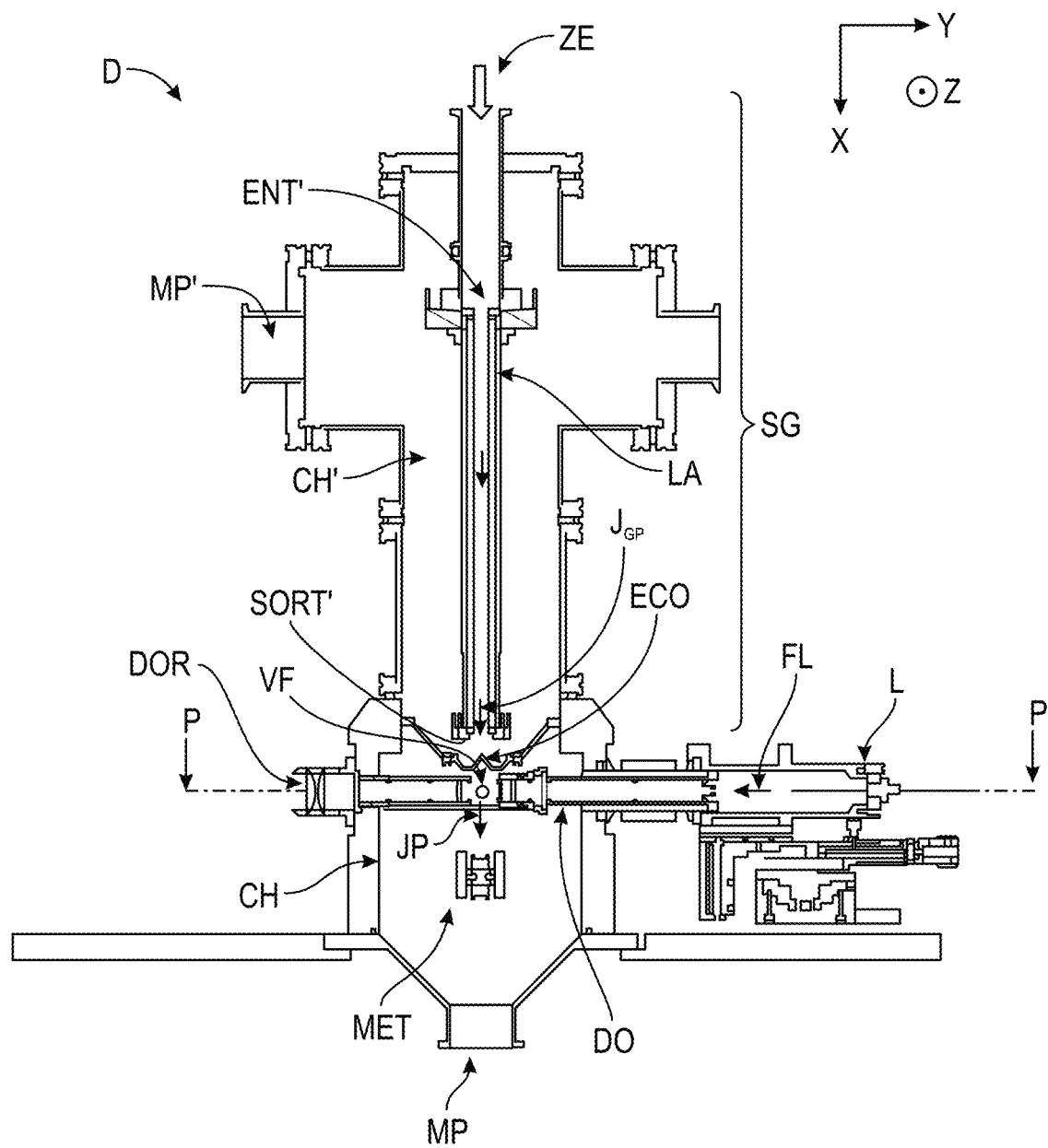
FIG. 3 shows a device for characterising particles of an aerosol, belonging to the system shown in FIG. 1, and operating by laser-induced breakdown spectrometry.

The interest of the dilution means for this purpose can be better explained after further description of the device D in question, with reference to FIG. 3 and following.

In FIG. 3, the device D for characterising said particles by laser-induced breakdown spectrometry (LIBS) is shown in more detail.

The device D comprises a system SG for generating, from the gas coming from the sampler E, a jet of particles JP in a chamber CH with which is associated a means of pumping MP the gas present in the chamber in order to create a vacuum in this chamber. Typically, the pressure in the chamber CH may be in the order of 0.05 mbar or less.

The system SG may for example comprise an aerodynamic lens LA, a chamber CH' vacuum by means of a pumping means MP' and advantageously a divertor ECO. The aerodynamic lens LA is supplied, at the inlet ENT', with the gas sampled, and possibly diluted, from the sampler E, which may contain particles in the form of aerosols. At the outlet SORT' of the aerodynamic lens LA, a jet $J_G$ of particles in a carrier gas is then generated in the expansion chamber CH', in particular due to the fact that it is in a vacuum—typically the pressure is of the order of 0.5 mbar or even less. The particle jet $J_G$ in a carrier gas then passes through a divertor ECO which has the effect of removing most of the carrier gas so that after the divertor, i.e. in the chamber CH, only a particle jet JP remains. With an aerodynamic lens, one can typically have a vacuum in the chamber CH defined by a pressure between $10^{-3}$ mbar and 1 mbar. This allows to ensure an optimal operation.

Instead of the aerodynamic lens, a nozzle could be provided (not shown). With a nozzle, with the same objective of ensuring an optimal operation, one can typically have a vacuum in the chamber CH defined by a pressure between $10^{-3}$ mbar and 1 mbar.

The device D also comprises a laser L capable of emitting a laser beam FL in the form of pulses.

Associated with this laser L is an optical device DO arranged to focus the beam FL in the chamber CH, perpendicular to the direction DP of propagation of the particle jet JP.

This allows to create a plasma in a focal volume VF by the interaction between the laser beam FL and the particles $N_P$ in the jet JP of particles, plasma which emits other particles characteristics of the interaction between the laser beam FL and the particles in the jet. These other particles can be ions, elections or photons.

Reference can be made in particular to FIG. 3.

The fact of operating under vacuum in the chamber CH where the interaction between the laser beam FL and the particles $N_P$ of the jet JP takes place allows the detection of very small particles, typically smaller than a few hundred nanometres and in particular smaller than 200 nm and even smaller than 100 nm, without difficulties. This has already been reported with gold nanoparticles with sizes of the order of 15 nm.

The Laser L can for example be a fibre laser.

Its repetition frequency (of the pulses) can generally be between 1 kHz and 1 Mhz. A minimum repetition frequency is of interest in order to characterise a number of aerosol particles sampled in a reasonable time. A much higher repetition frequency of the order of Mhz may be of interest when the particle concentration in the gas sampled by the sampler is relatively low, in order to increase the particle count rate per unit time.

The minimum intensity to be implemented at the level of the focal volume is typically of the order of 10 GW/cm$^2$. This corresponds roughly to the intensity required to produce a plasma in the focal volume VF. To achieve this, the intrinsic characteristics of the laser L can obviously be used, but also, alternatively or in addition, the characteristics of the optical device DO.

The optical device DO may in particular be in the form of optical lenses or simply a microscope objective.

Typically, a fibred laser L operating at 1065 nm, with a pulse energy of approximately 0.2 mJ, associated with a 10× magnification microscope objective DO, allows this minimum intensity of 10 GW/cm$^2$ to be obtained in the focal volume VF.

Beyond the focal volume VF, i.e. after interaction with the particles of the particle jet JP, the laser beam FL is advantageously recollimated by an optical device DOR, referred to as recollimation, for example in the form of a set of lenses. The recollimated laser beam FL can then be sent to a means (not shown in the attached figures) capable of measuring the power of the laser beam FL. This allows to ensure, a posteriori, that the power theoretically injected by the laser L is indeed that provided by this laser L.

The device D also comprises at least one detection device DD comprising a means MC for collecting the particles emitted by the plasma and a means MAS for performing a spectrometric analysis of these particles.

The means MC for collecting the particles emitted by the plasma can be of various designs.

However, within the scope of the invention, it is advantageous to envisage, as a collection means, a plurality of N optical fibres $FO_1$, $FO_2$, $FO_3$, ..., $FO_{N-1}$, $FO_N$, with N a natural number strictly greater than unity, one end $E_1$, $E_2$, $E_3$, ..., $E_{N-1}$, $E_N$ of each optical fibre $FO_1$, $FO_2$, $FO_3$, ..., $FO_{N-1}$, $FO_N$ being arranged for this purpose around the focal volume VF and pointing towards this focal volume VF.

The advantage of providing a multitude of optical fibres is that, in particular with reference to the use of a single optical fibre for the collection of the particles emitted by the plasma, the number of particles collected can be multiplied. This then allows to increase the sensitivity of the detection device DD. It is understandable that the greater the number of optical fibres, the greater the sensitivity.

Advantageously, a chamber CH may also be provided, the external wall $P_{EXT}$ of which is spherical in shape. In this case, the optical fibres FO, mounted on the wall of the chamber CH, can be arranged on this sphere to best cover the maximum solid angle of $4\pi$ steradians around the focal volume VF where the plasma is generated. This arrangement allows to increase the sensitivity of the detection device DD compared to any other arrangement for a given number N of collection optical fibres. The end of each optical fibre $FO_1$, $FO_2$, $FO_3$, ..., $FO_{N-1}$, $FO_N$ will typically be located at a distance of a few millimetres from the centre of the focal volume VF, the exact value depending on the core diameter of the optical fibres used to maintain a same solid collection angle.

As a non-limiting example, here is an example of a possible implementation. N=158 optical fibres mounted on a spherical external wall $P_{EXT}$ of the chamber CH. Each optical fibre has a core diameter of 1 mm. Such an arrangement theoretically allows the collection of 44% of all the particles emitted by the plasma when the respective ends $E_1$, $E_2$, $E_3$, ..., $E_{N-1}$, $E_N$ of the different optical fibres are arranged between 4 mm and 6 mm from the centre of the focal volume VF. With reference to a collection means comprising a single optical fibre, the core diameter of which is 600 microns and the collection end of which is located 4 mm from the centre of the focal volume VF, the quantity of particles emitted by the plasma that are collected is theoretically multiplied by 317.

Different options are available for the spectrometric analysis means MAS, MAS'.

Figure 6A:
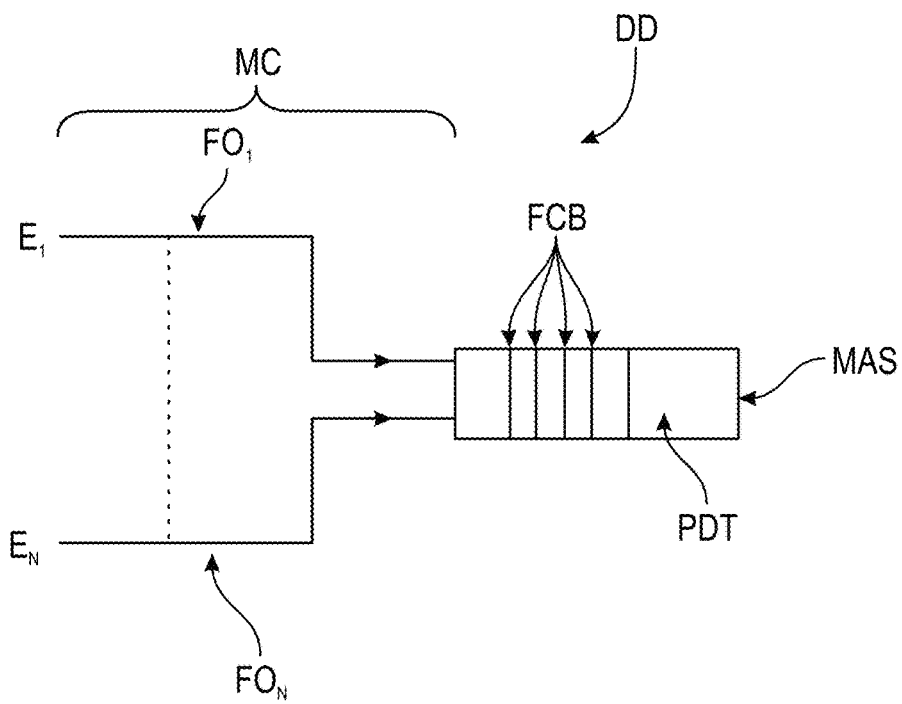
FIG. 6a is a schematic representation of a detection device, comprising the optical fibres collection means shown in FIGS. 5a to 5d.

Thus, according to a first option represented in FIG. 6(a), a spectroscopic analysis means MAS can be envisaged comprising at least one filter FCB of the notch type, capable of ensuring a filtering in a given wavelength band and at least one photodetector PDT, for example of the electron photomultiplier type. For example, the PMT H12775 proposed from the company Hamamatsu can be used, see https://www.hamamatsu.com/eu/en/product/type/H12775/index.html.

The notch filter thus selects a specific spectral domain and the intensity of the light (among the particles emitted by the plasma, there are photons) in this spectral domain is determined by the photodetector PDT.

For example, if we consider 4 spectral bands A, B, C and D, we will obtain the intensity of the signal in each of the bands considered, i.e. $I_I$ respectively, with I=A, B, C or D depending on the spectral band considered. For this purpose, it is necessary to provide a plurality of notch filters FCB ensuring a selection in distinct bands and as many photodetectors PDT, in particular of the electron photomultiplier type, as there are filters FCB.

One can also measure the overall intensity $I_G$ of the signal, i.e. the intensity taken for all the bands A, B, C and D and over a long accumulation time.

Alternatively, for each spectral band A, B, C and D considered, the number of events $N_{EI}$ can be counted, with I=A, B, C or D depending on the spectral band considered (independently of any intensity measurement).

These different data, $N_{EI}$, $I_I$ and $I_G$ are related to distinct physical quantities of the particles in the particle jet that are being analysed.

Thus, the number of events $N_{EI}$ can be related to the number of particles in the particle jet that are detected, knowing the dilution rate applied with the dilution means MD, MD' to ensure that at most one individual particle (i.e. at most only one particle) is present in the focal volume VF.

This will be detailed in the following description.

The number of particles in the gas sampled by the sampler E can thus be determined, i.e. a number concentration of the particles (i.e. a number of particles per unit volume) in the gas sampled by the sampler E.

Furthermore, $I_I$ is proportional to the number of atoms of a given chemical element present in the individual particle analysed, i.e. the proportion of the corresponding chemical element in the individual particle analysed. It is therefore clear that the comparison of the intensities measured in the different spectral bands A, B, C and D allows to obtain the respective proportions of the different chemical elements (4 if one has an intensity in the 4 spectral bands mentioned above) present in the individual particle analysed.

On the other hand, when there is only one chemical element present in the individual particle being analysed, then the signal $I_I$ depends only on the size of the individual particle being analysed. Consequently, the determination of the average value of the intensity $I_I$ over a large number of events is proportional to the average size of the individual particles successively analysed in the gas sampled by the sampler E. And it is this average size data that is representative.

In addition, the overall intensity $I_G$ is proportional to the number of atoms present in the individual particle being analysed. In this way, a mass concentration of particles in the gas sampled by the sampler E can be determined.

It is therefore possible, for example in the case of an atmospheric monitoring of aerosols of a given chemical nature, to obtain the mass concentration, the number concentration and the average size of the particles present in the aerosol.

From a practical point of view, this can be performed after calibration of the type of aerosol to be detected for different particle sizes. This calibration must first be carried out in the laboratory so that the assembly of these data can be determined in the field.

Furthermore, it should be noted that the response time of a photodetector of the electron photomultiplier type is very low, typically of the order of a few nanoseconds. This type of detection is therefore particularly well suited to the use of a pulsed laser with a high repetition frequency, as in the case of the invention. No special precautions need to be taken to avoid the response/accumulation time of the photodetector PDT being longer than one cycle of the laser (cycle=time between two pulses of the laser).

The efficiency of the measurement can be further improved when it is known which type of particle forms the aerosol. In this case, it is indeed advantageous to limit the measurement time to the time during which the plasma emits particles (known by experiment), including photons, by blocking the accumulation made by the or each photodetector PDT as soon as the plasma no longer emits particles. This can be perfectly synchronised with the operation of the pulsed laser L. This allows to increase the signal/noise ratio by limiting the accumulation time of the signal to the minimum necessary. Any intensity measurement on the signal is therefore better.

If we take our example again, taking into account the number N=158 of available optical fibres, we note that it is conceivable, if for example, we wish to carry out, at the same time, a detection in 4 different spectral bands (for example the bands A, B, C and D discussed previously, capable of characterising 4 particles of different natures in the particle jet), to provide 4 interference filters and in this case to have the particles emitted by the plasma collected by, for example, 40 optical fibres for 3 out of the 4 interference filters and 38 optical fibres for the $4^{th}$ interference filter, come to each interference filter.

Figure 6B:
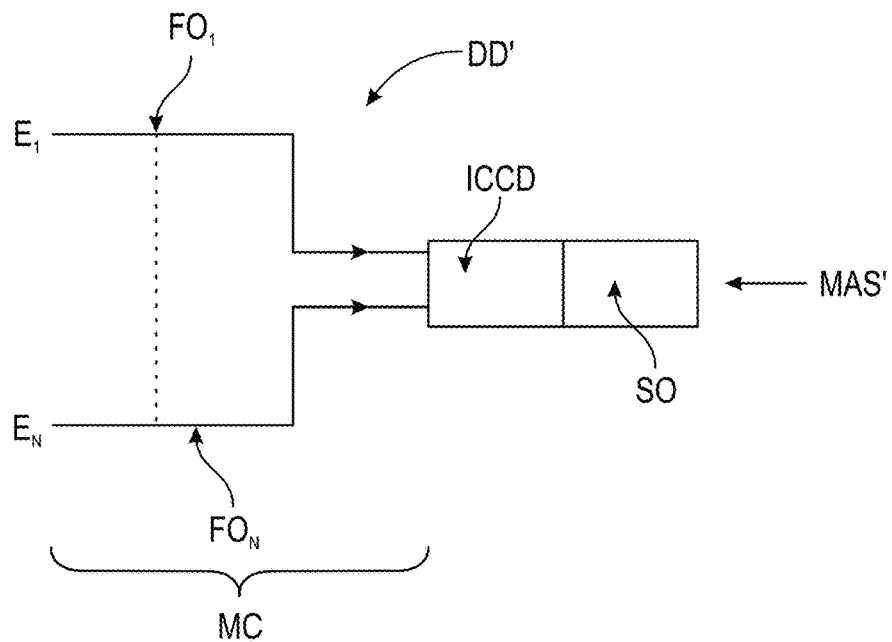
FIG. 6b is a schematic representation of an alternative detection device, also comprising the optical fibre collection means shown in FIGS. 5a to 5d.

According to a second option shown in FIG. 6(b), a spectroscopic analysis means MAS' can be envisaged comprising an optical spectrograph SO equipped with a camera of the intensified charge coupled device ICCD type.

This second option allows for a full spectral analysis over a very wide wavelength range.

It also allows a quantification of the chemical elements present in the individual particles of the particle jet that are analysed—after laboratory calibration.

This option finally allows to give access to the same information as those obtained with the first option, i.e. a mass concentration, a number concentration and a size of the aerosol particles.

In practice, the intensity $I_G$ can be obtained by selecting a mode referred to as "accumulation" on the camera ICCD.

On the other hand, to obtain $I_I$ and $N_{IE}$ (with I=A, B, C or D if we take the example presented above), a specific operating mode of the camera ICCD must be used to compensate for the slow acquisition speed of this camera. The response time of this type of camera is in the order of a hundred milliseconds, which is not necessarily compatible with the use of a pulse laser operating at a high repetition frequency. Also, the accumulation time of the camera ICCD must be maintained shorter than the time between two successive laser pulses, taking due account of the delay between a laser pulse and the start of acquisition by the camera ICCD, the gate width, i.e. the time during which the camera ICCD accumulates the signal, and the read-out time of the camera ICCD, i.e. the time during which the electronics associated with the camera read the information contained on the pixels of the camera ICCD.

As mentioned earlier, the dilution means MD, MD' has a role in determining the number concentration (i.e. volume) of particles in the aerosol present in the gas sampled by the sampler; this can only be done correctly by ensuring that the characterisation device D for the particles by laser-induced breakdown spectrometry analyses only one individual particle in the focal volume VF at a time.

Figure 4:
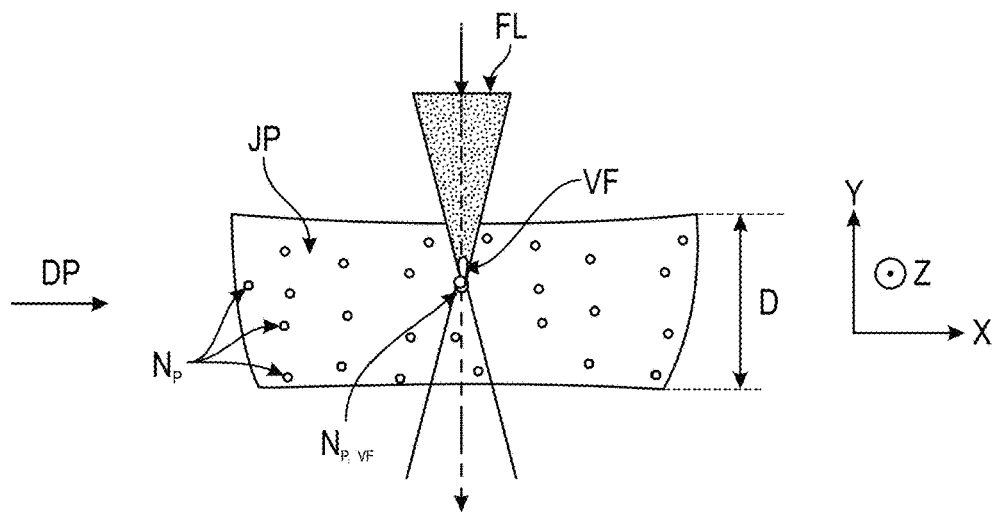
FIG. 4 shows schematically an area of interaction, within the device shown in FIG. 3, between a laser beam and a particle jet formed with the aerosol particles from the sampler in FIG. 2.
Figure 5A:
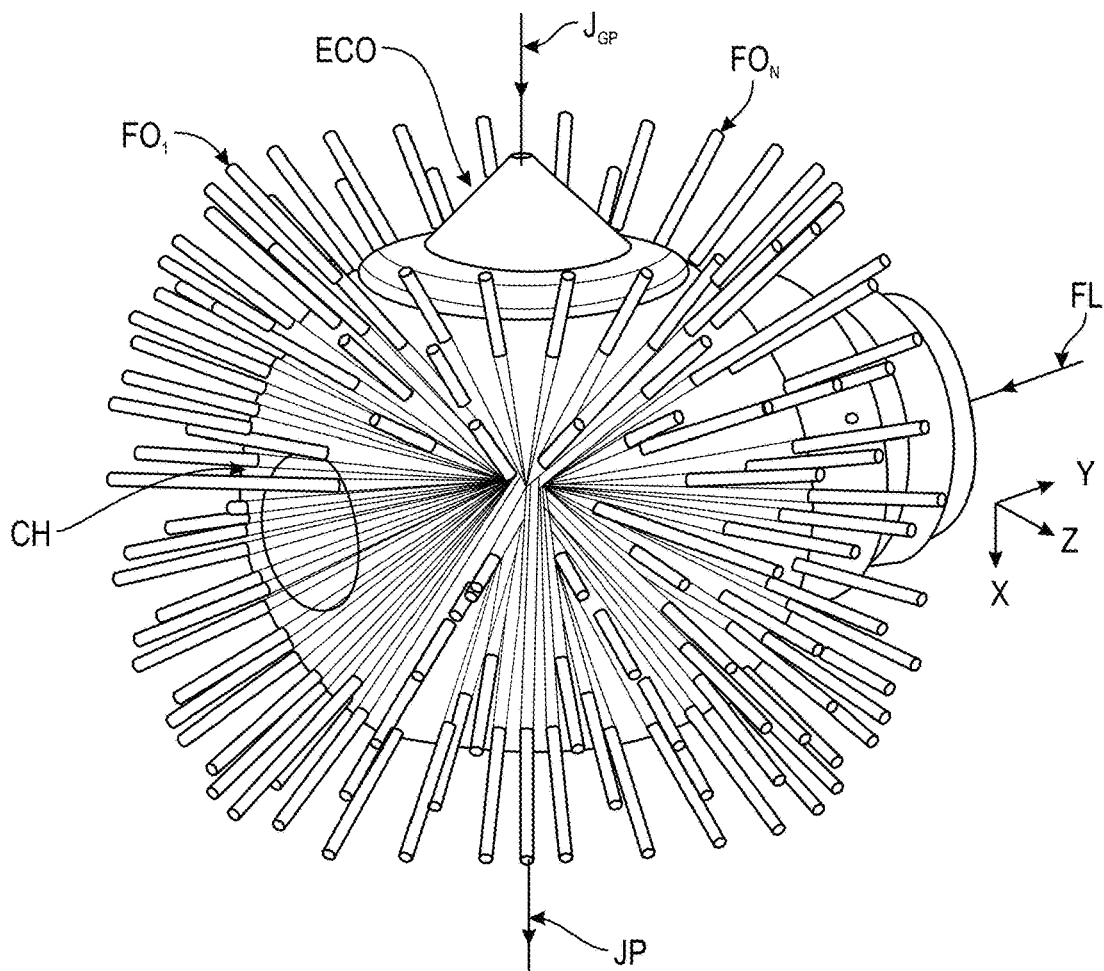
FIG. 5a is an external perspective view of a portion of the characterisation device shown in FIG. 2, portion in which there is shown a means for collecting, in the form of a plurality of optical fibres, particles generated by an interaction between a laser beam of said device with the particles of the aerosol.
Figure 5B:
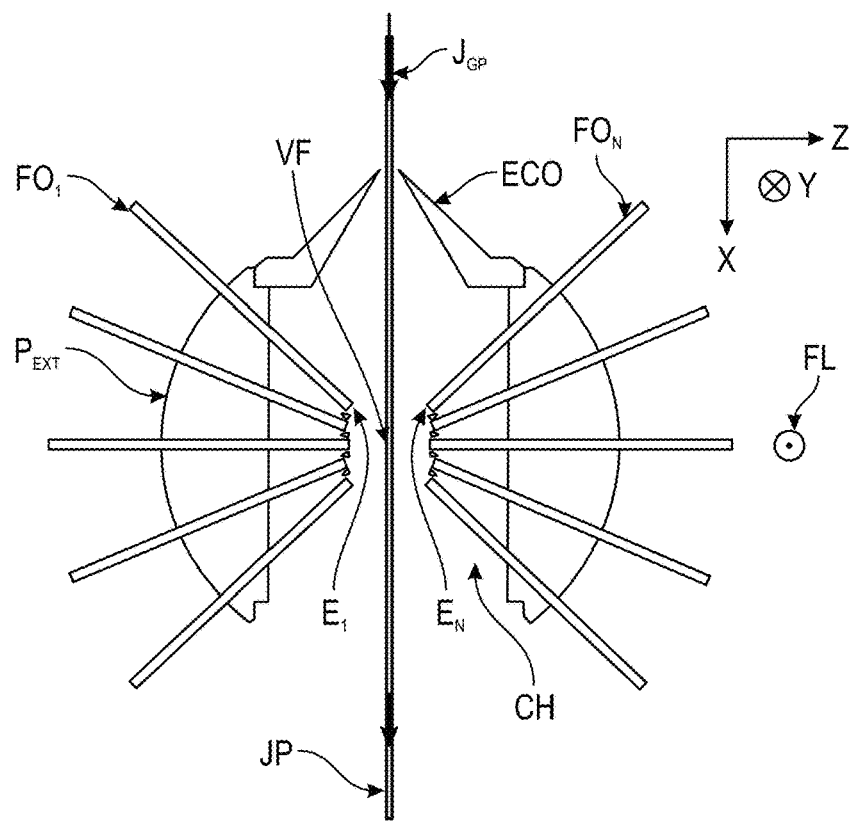
Figure 5C:
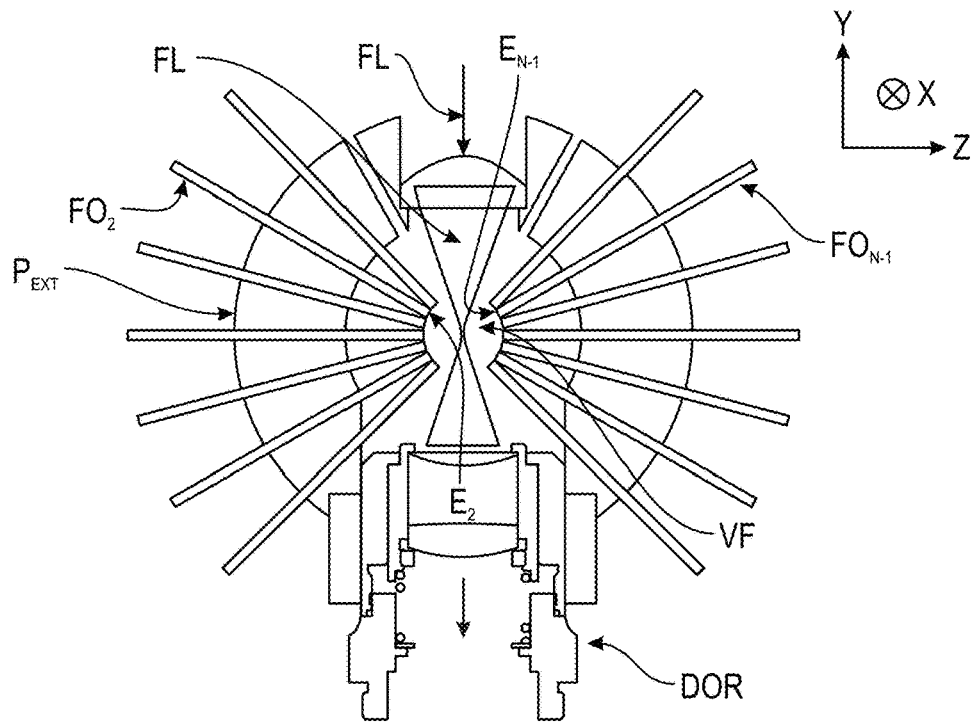
Figure 5D:
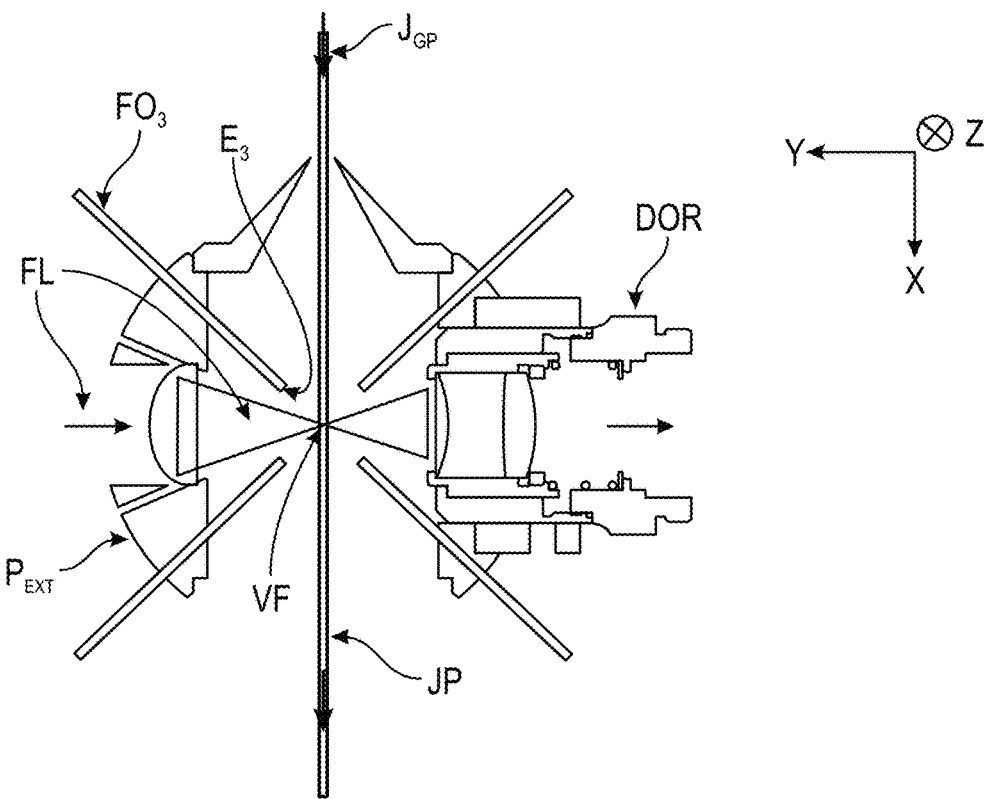

From a statistical point of view, it can be shown that the focal volume VF of the device D will only show an individual particle from the particle jet (see FIG. 4) if a particle is detected in at most 1 in 10 laser shots. If this value is exceeded, then the dilution means MD, and possibly MD' if necessary, can be controlled to ensure that only 1 particle is detected more than every 10 laser shots. And it is the dilution rate applied with the dilution means MD, MD', to obtain at most one particle detection per 10 laser shots, that allows to trace the number concentration of the aerosol particles in the gas sampled by the sampler E.

Also and advantageously, and as represented (in dotted lines) in FIG. 1, the system S according to the invention may comprise a processor P configured to control the dilution means MD, and possibly the additional dilution means MD' when the latter is provided and necessary, as a function of the data provided by the detection device DD (detection of a number of particles every 10 laser shots) of the device D for characterising the particles by laser-induced breakdown spectrometry.

The information obtained with the system S according to the invention as described above and in particular the characterisation device D, namely in particular the concentration in mass, number and size of the particles, can be completed.

Figure 7:
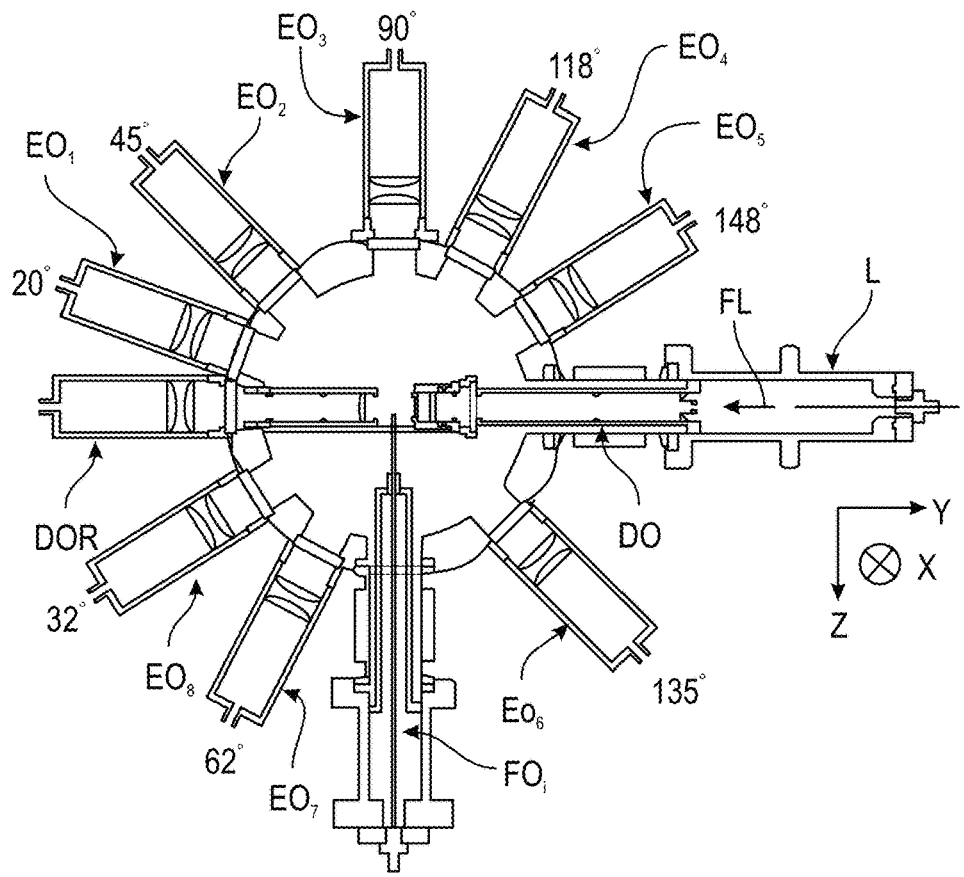
FIG. 7 is an enlarged view taken according to a cross-sectional plane P-P of the device shown in FIG. 2, in which another collection means, complementary to the one shown in FIGS. 5a to 5d and formed by an assembly of optical collectors able to collect the particles generated by the interaction between the laser beam and the particles of the aerosol, is shown.
Figure 8:
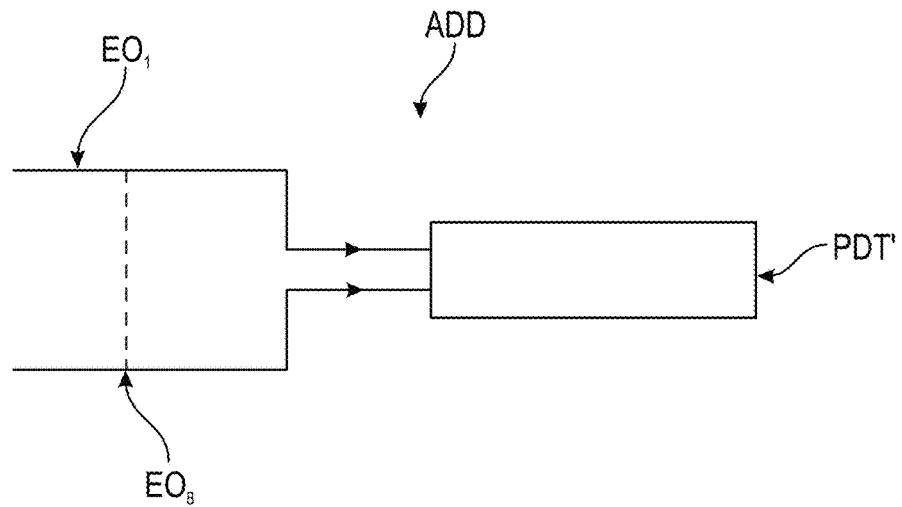
FIG. 8 shows a means for analysing the particles collected by the collection means of FIG. 7.

Thus, the system S according to the invention advantageously comprises, as shown in FIG. 7, a further detection device ADD comprising:
- a plurality of optical assemblies EO1 to EO8, mounted on the chamber CH and angularly distributed around the chamber CH, for collecting the particles emitted by the plasma, and
- at least one photodetector PDT connected to said plurality of optical assemblies EO1 to EO8 to analyse the angular distribution of said particles.

In particular, each optical assembly EO1 to EO8 can in particular be formed with lenses. In FIG. 7, a specific number (N=8) of optical assemblies and a specific angular positioning (angle value) of these optical assemblies are given as an indication, but representative of a practically feasible implementation.

This other detection device ADD aims to determine the angular scattering of a beam of light crossing the particle jet (including photons), referred to as SLS (Static Light Scattering).

This technique, known per se, allows to determine the size and the morphology of particles in the form of agglomerates, if their optical properties are known, i.e. if their chemical nature is known. As explained above, the LIBS allows to determine the chemical nature of an element present in the particles of the particle jet. For this purpose, the laser described above can be used, but in such a way that no plasma is generated. This can be done in particular, for example, with a continuous laser beam. Another laser operating at wavelengths close to green or blue can also be used.

The data provided by SLS also allows for a better estimation of the mass concentration and the number concentration of the particles in the analysed particle jet—which can be compared with the results obtained by LIBS. Typically, particles in the form of agglomerates are soot (combustion products: combustion engine, fire, etc.).

Figure 9:
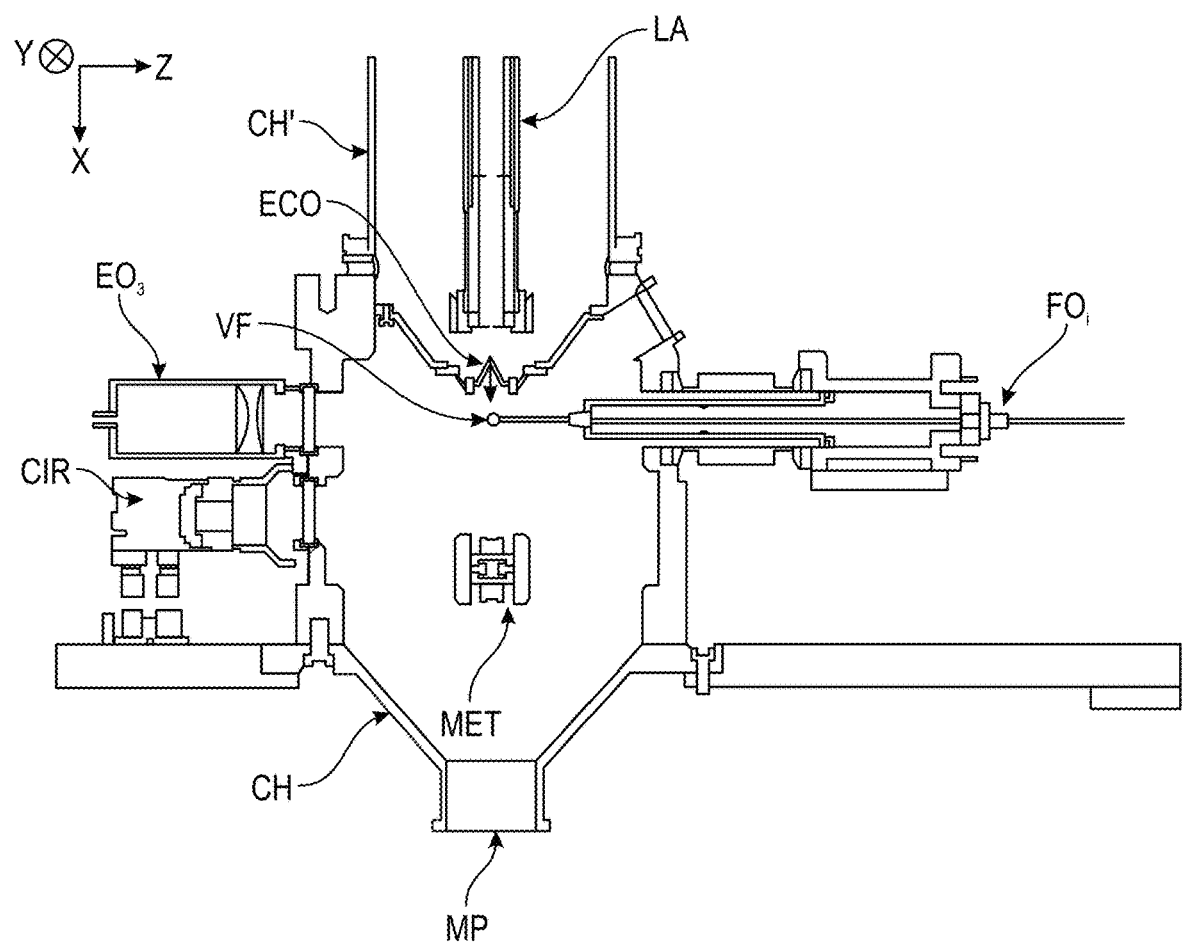
FIG. 9 is an enlarged view of the device shown in FIG. 2, in a different cross-sectional plane.

Thus also, the system S according to the invention advantageously comprises, as can be seen in FIG. 9, a camera sensitive in the infrared CIR, generally in the near infrared, arranged to measure a temperature evolution of the particles of the particle jet.

The camera CIR allows to implement the technique known by the acronym LII for "Laser-Induced Incandescence".

In order to implement this technique, the power provided by the laser L must be reduced, with reference to the LIBS. No plasma is generated in the focal volume, but only a heating of the particle $N_P$ present in the focal volume VF. This technique aims to determine the cooling of the particle which, as the chamber CH is under vacuum, depends only on the power lost by radiation (no convection, no conduction). And this power lost to radiation is related to the size of the particles under consideration as well as to their chemical nature. The cooling can be determined in time. However, here this measurement is advantageously performed spatially (the mounting in FIG. 9 allows this). Indeed, the particles are in flight in the particle jet, and are animated by a constant speed which can be perfectly calculated (in particular with the help of a calculation code of the CFD "Computational Fluid Dynamics" type) according to their size and their chemical nature. As this speed is relatively high (typically between 140 and 350 m/s depending on the size and the concentration of the particles), and as the particles cool slowly (the radiation is the only contributor in a vacuum), the cooling speed is measured spatially by the camera CIR, which is advantageously equipped with a wide angle lens. In FIG. 9, the camera is located downstream of the focal volume VF, if we consider the orientation of travel of the particle jet $J_P$. The camera CIR allows then to capture an image of the thermal emission of the particles in flight in the particle jet from and thus also after their interaction with the laser beam FL in the focal volume VF.

Finally, it should be noted that it may be interesting to collect the particles for an ex situ analysis, confirming or completing, with different techniques, the results obtained in real time with the system S according to the invention.

Figure 10:
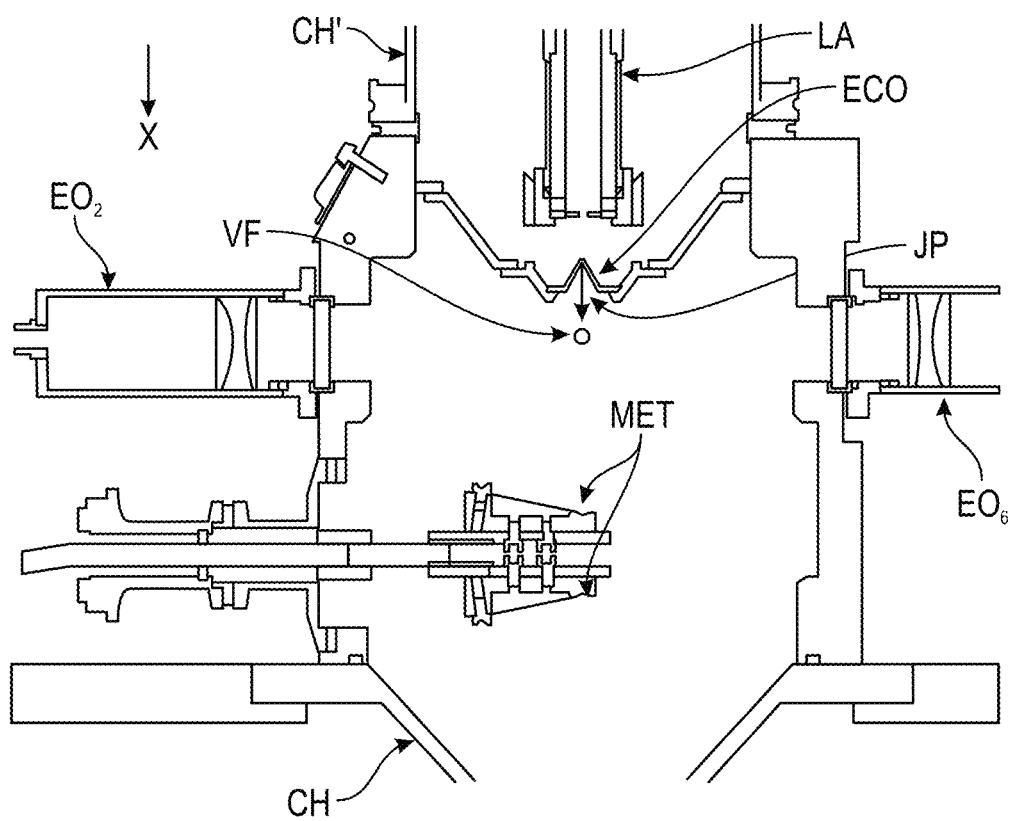
FIG. 10 is another view of the device shown in FIG. 2, in another sectional plane, otherwise also different from the sectional plane in FIG. 9.

For this reason, and as can be seen in particular in FIG. 10, it is useful for the device D to provide a substrate holder MET, which may comprise a substrate (the deposit can then be used to perform X-ray fluorescence, for example) and grids on either side of it (to carry out transmission electron microscopy). The substrate holder is advantageously mounted so that it can rotate around its main axis, so that the grids can be exposed to the particle jet for relatively short periods of time. Indeed, for the purpose of performing transmission electron microscopy, it is then possible to study the actual agglomeration state of the particles in the jet (if layers of particles were deposited on these grids, as is performed on the substrate, this could not be considered).

Among the possible characterisations, the one relating to the number concentration of the particles to be characterised is particularly interesting in the scope of the invention.

Also, the invention relates to a method for implementing a system S according to the invention, said method comprising the following steps:
a) sampling an ambient gas, which is likely to comprise particles in aerosol form in a number concentration to be characterised;
b) detecting said particles by laser-induced breakdown spectrometry, each detection consisting of a detection of at most one individual particle in said focal volume VF;
c) counting, per unit of time, the number of particles detected in the step b); and
d) determining the number concentration of said particles in the sampled ambient gas from a comparison between the data resulting from the step c) and a database relating said number concentration to said count per unit time.

It should be noted that the particles whose number concentration is to be characterised necessarily have a given elemental chemical composition.

The database is established by performing a calibration in which, for different types of particles of interest, the relationship between the known number concentration of the particle type concerned and the count performed of it is established for each of the different particle types. It is this basis that allows, in use, from a count carried out on a sample the number concentration of which of a type of particle sought is not known, to 30 determine this concentration.

The method may comprise, between the step a) and the step b), a step of controllably decreasing the concentration of the particles present as an aerosol in the sampled ambient gas to ensure that the focal volume VF comprises at most one individual particle.

The invention claimed is:

1. A system(S) for characterising particles in the form of an aerosol in an ambient gas, comprising:
   a sampler (E) capable of sampling the ambient gas likely to comprise particles in the form of aerosols;
   a device (D) for characterising said particles by laser-induced breakdown spectrometry, the device (D) comprising:
   a system (SG) for generating, from the gas coming from the sampler (E), a jet of said particles (JP) in a chamber (CH) with which is associated a means (MP) for pumping the gas present in the chamber in order to create a vacuum in this chamber,
   a laser (L) capable of emitting a laser beam (FL) in the form of pulses, with which is associated an optical device (DO) arranged to focus said laser beam in the chamber (CH), perpendicularly to a direction of propagation of the particle jet (JP), to create, in a focal volume (VF), a plasma by the interaction between the laser beam (FL) and the particles (NNP) of the jet, said plasma emitting other particles, characteristics of the interaction between the laser beam and said particles of the jet,
   at least one detection device (DD, DD') comprising a means (MC) for collecting the particles emitted by the plasma and a means (MAS, MAS') for performing a spectrometric analysis of these particles;
   wherein said system(S) further comprises at least one dilution means (MD, MD') located between a sampling area (ZP) of the sampler (E) for the ambient gas likely to contain particles in aerosol form and the device (D) for characterizing said particles by laser-induced breakdown spectrometry, said at least one dilution means being intended to decrease the concentration of the particles in aerosol form in the ambient gas sampled by the sampler, so that the focal volume (VF) comprises at most one individual particle.

2. The system(S) according to claim 1, wherein said dilution means (MD) belong to the sampler (E).

3. The system(S) according to claim 1, wherein it comprises an additional dilution means (MD') arranged between the sampler (E) and the device (D) wherein said particles are characterized by laser-induced breakdown spectrometry.

4. The system(S) according to claim 3, further comprising a processor (P) configured to control the dilution means (MD), and possibly the additional dilution means (MD'), as a function of the data provided by the detection device (DD) of the device (D) wherein the particles are characterized by laser-induced breakdown spectrometry.

5. The system(S) according to claim 1, wherein the detection device (DD, DD') comprises a plurality of N optical fibres ($FO_1$, $FO_2$, $FO_3$, . . . , $FO_{N-1}$, $FO_N$), with N a natural number strictly greater than the unity, one end (E1, E2, E3, . . . , EN) of each optical fibre ($FO_1$, $FO_2$, $FO_3$, . . . , $FO_{N-1}$, $FO_N$) being arranged around the focal volume (VF) and pointing towards this focal volume (VF) in order to ensure the collection of the particles emitted by the plasma.

6. The system(S) according to claim 1, wherein said optical fibres (FO) are mounted on an external wall ($P_{EXT}$), of spherical shape, of the chamber (CH).

7. The system(S) according to claim 1, wherein the means (MAS) for performing a spectrometric analysis of the particles emitted by the plasma comprises:
   at least one filter (FCB) of the notch type, capable of ensuring a filtering in a given wavelength band, and
   at least one photodetector (PDT), which is of an electron photomultiplier type.

8. The system(S) according to claim 1, wherein the means for performing a spectrometric analysis of the particles emitted by the plasma comprises:
- a plurality of notch type filters (FCB), capable of ensuring a filtering in a band of wavelengths distinct from each other, and
- a photodetector (PDT), which is of an electron photomultiplier type, associated with each notch filter.

9. The system(S) according to claim 1, wherein the means (MAS') for performing a spectrometric analysis of the particles emitted by the plasma comprises:
- an optical spectrograph (OS), equipped with:
- a camera of the intensified charge coupled device (ICCD) type.

10. The system(S) according to claim 1, comprising a further detection device (ADD) comprising:
- a plurality of optical assemblies (EO1 to EO8), mounted on the chamber (CH) and angularly distributed around this chamber (CH), for collecting the particles emitted by the plasma, and
- at least one photodetector (PDT') connected to said plurality of optical assemblies (EO1 to EO8) to analyse the angular distribution of said particles.

11. The system(S) according to claim 1, further comprising an infrared camera (CIR) arranged to measure a temperature evolution of the particles of the particle jet.

12. A method for implementing a system according to claim 1, said method comprising the following steps:
a) sampling an ambient gas, which may comprise particles in aerosol form in a number concentration to be characterised;
b) detecting said particles by laser-induced breakdown spectrometry, each detection consisting of a detection of at most one individual particle in said focal volume (VF);
c) counting, per unit of time, the number of particles detected in the step b); and
d) determining the number concentration of said particles in the sampled ambient gas from a comparison between the data resulting from the step c) and a database relating said number concentration to said count per unit time.

13. The method according to claim 1, further comprising, between the step a) and the step b), a step consisting of decreasing in a controlled manner the concentration of the particles present in the form of an aerosol in the ambient gas sampled to ensure that the focal volume (VF) comprises at most one individual particle.

* * * * *